US012791161B2

(12) United States Patent
Jacek et al.

(10) Patent No.: US 12,791,161 B2
(45) Date of Patent: Nov. 10, 2026

(54) LIGHTING DEVICE FOR THE BACK REGION OF A MOTOR VEHICLE

(71) Applicant: HELLA GMBH & CO. KGAA, Lippstadt (DE)

(72) Inventors: Bernard Jacek, Lippstadt (DE); Fabian Dorda, Sundern (DE); Matthias Werner, Volkmarsen (DE); Christian Zschaler, Lippstadt (DE)

(73) Assignee: HELLA GMBH & CO. KGAA, Lippstadt (DE)

( * ) Notice: Subject to any disclaimer, the term of this patent is extended or adjusted under 35 U.S.C. 154(b) by 0 days.

(21) Appl. No.: 19/348,941

(22) Filed: Oct. 3, 2025

(65) Prior Publication Data

US 2026/0029103 A1 Jan. 29, 2026

Related U.S. Application Data

(63) Continuation of application No. PCT/EP2024/053036, filed on Feb. 7, 2024.

(30) Foreign Application Priority Data

Apr. 3, 2023 (DE) ......................... 102023108414.3
May 26, 2023 (DE) ......................... 102023113946.0

(51) Int. Cl.
*F21S 43/40* (2018.01)
*F21S 43/14* (2018.01)
(Continued)

(52) U.S. Cl.
CPC ............. *F21S 43/401* (2024.05); *F21S 43/14* (2018.01); *F21S 43/265* (2024.05); *F21S 43/31* (2018.01);
(Continued)

(58) Field of Classification Search
CPC .... F21S 43/26241; F21S 43/40; F21S 43/331; F21S 43/332; B60Q 1/56
See application file for complete search history.

(56) References Cited

U.S. PATENT DOCUMENTS 7,222,998 B2 * 5/2007 Katase ..................... B60Q 1/56 362/497
8,262,269 B2 * 9/2012 Koizumi .................. B60Q 1/56 362/244

(Continued)

FOREIGN PATENT DOCUMENTS

EP 3783259 A1 2/2021
JP 2015076249 A 4/2015
WO 2013073419 A1 5/2013

OTHER PUBLICATIONS

The International Search Report of the International Searching Authority for Application No. PCT/EP2024/053036, dated Apr. 17, 2024 (2 pages).

*Primary Examiner* — Eric T Eide
(74) *Attorney, Agent, or Firm* — WARNER NORCROSS + JUDD LLP

(57) ABSTRACT

The invention relates to a lighting device for the back region of a motor vehicle. The lighting device includes: a light source; a housing on or in which the light source is arranged; a cover panel covering the housing at least in sections; and a reflection apparatus disposed outside of the housing. The light generated by the light source emerges at least in part from the housing of the lighting device through the cover panel when the lighting device is in the installed state. The
(Continued)

light that has emerged through the cover panel is at least partly incident on the reflection apparatus and is at least partly reflected by the reflection apparatus, such that it moves away backward from the back region of the motor vehicle.

14 Claims, 7 Drawing Sheets

(51) Int. Cl.

| | |
|---|---|
| ***F21S 43/20*** | (2018.01) |
| ***F21S 43/31*** | (2018.01) |
| ***F21S 43/33*** | (2018.01) |
| ***F21S 43/37*** | (2018.01) |
| ***F21W 103/10*** | (2018.01) |
| ***F21W 103/35*** | (2018.01) |
| ***F21Y 113/13*** | (2016.01) |
| ***F21Y 115/10*** | (2016.01) |

(52) U.S. Cl.
CPC ........... *F21S 43/331* (2024.05); *F21S 43/332* (2024.05); *F21S 43/37* (2018.01); *F21W 2103/10* (2018.01); *F21W 2103/35* (2018.01); *F21Y 2113/13* (2016.08); *F21Y 2115/10* (2016.08)

(56) References Cited

U.S. PATENT DOCUMENTS

| | | | | |
|---|---|---|---|---|
| 9,586,523 | B2 * | 3/2017 | Salter | F21S 41/176 |
| 12,173,860 | B2 * | 12/2024 | Joo | F21S 43/31 |
| 2003/0128549 | A1 * | 7/2003 | Matsuura | G02B 6/0081 362/23.15 |
| 2004/0070989 | A1 | 4/2004 | Amano et al. | |
| 2005/0093684 | A1 * | 5/2005 | Cunnien | B60Q 1/56 348/148 |
| 2006/0285348 | A1 * | 12/2006 | Valcamp | F21S 43/26 362/240 |
| 2010/0149803 | A1 | 6/2010 | Nakano et al. | |
| 2011/0317442 | A1 * | 12/2011 | Makiuchi | F21S 43/40 362/519 |
| 2012/0163031 | A1 | 6/2012 | Okada et al. | |
| 2016/0245475 | A1 | 8/2016 | Dubosc | |
| 2022/0154909 | A1 * | 5/2022 | Tischler | B60Q 1/2619 |

* cited by examiner

LIGHTING DEVICE FOR THE BACK REGION OF A MOTOR VEHICLE

CROSS-REFERENCE TO RELATED APPLICATIONS

The present application is a continuation of PCT/EP2024/053036, filed Feb. 7, 2024, which claims priority to German Patent Application DE 10-2023-108-414.3, filed Apr. 3, 2023, and German Patent Application DE 10-2023-113-946.0, filed May 26, 2023, the disclosures of which are incorporated by reference in their entirety.

FIELD OF THE INVENTION

The present invention relates to a lighting device for the rear end of a motor vehicle.

BACKGROUND OF THE INVENTION

Lighting devices arranged in the rear end of a motor vehicle are well known. They can be used to generate different lighting functions and can, for example, function as a tail light, a brake light, a position light, a reversing light, a daytime running light or a direction indicator. The light generating these lighting functions is usually emitted directly from the lighting device rearward.

SUMMARY OF THE INVENTION

The problem underlying the present invention is the creation of a lighting device of the type mentioned above, which has a construction that differs from the tail lights described and makes it possible to achieve an appealing external impression.

According to the invention, this is achieved by a lighting device of the type mentioned at the beginning with the features discussed herein. According to one embodiment, the lighting device comprises: a light source; a housing on or in which the light source is arranged; a cover panel covering the housing at least partially; and a reflection device disposed outside of the housing; wherein the lighting device is configured for the light generated by the light source to emit at least partially from the housing of the lighting device through the cover panel when the lighting device is in the installed state, for the light that is emitted through the cover panel to be at least partially incident on the reflection device and to be at least partially reflected by the reflection device such that it moves away from the rear end of the motor vehicle rearward.

This configuration ensures that at least part of the light is not emitted directly rearward from the lighting device but is reflected rearward from an area underneath a part of the housing. This light reflected rearward can, for example, perform the function of a tail light.

It may be provided that the reflection device has a diffusing structure. The diffusing structure allows the light to be at least partially reflected back diffusely.

It is possible for the reflection device to have a transparent component that has an entry surface for the light emitted through the cover panel. By integrating a transparent component into the reflection device, an impression can be created for the observer that makes it unclear about the exact position of the plane of the reflection. Such reflection devices are sometimes also called "frosted glass."

It may be provided that the reflection device has a reflective layer that at least partially reflects the incident light. Alternatively, the reflection device may have a component, in particular an opaque component, which at least partially reflects the incident light.

It is possible for the diffusing structure to be arranged on the entry surface of the transparent component or on an exit surface of the transparent component opposite the entry surface.

It may be provided that the reflective layer or the component, in particular an opaque component, is arranged on the exit surface of the transparent component opposite the entry surface. In particular, this type of configuration gives the impression when looking at the reflection device that the exact position of the plane of the reflection cannot be detected.

It is possible for the diffusing structure to be arranged on the exit surface of the transparent component opposite the entry surface and for the reflective layer or the component, in particular the opaque component, to be arranged on the side of the diffusing structure of the transparent component facing away from the exit surface.

Alternatively, the reflective layer can also be arranged in the transparent component.

It may be provided that the reflection device is arranged on the outside of the cover panel, wherein the cover panel has a first section through which the light emerges from the housing and a second section on which the reflection device is arranged, wherein the first section is different from the second section and wherein the second section is arranged below the first section in the installed state of the lighting device, in particular wherein the second section encloses an angle of between 30° and 80° with the first section.

Alternatively, it may be provided that the reflection device is arranged on the outside of the housing, wherein a section of the housing on which the reflection device is arranged is arranged below the first section of the cover panel when the lighting device is installed, in particular wherein the section of the housing on which the reflection device is arranged is arranged at an angle of between 30° and 80° to the first section of the cover panel.

Further alternatively, it may be provided that the reflection device is arranged to be mounted on the outside of the vehicle body of the motor vehicle, wherein the section of the vehicle body to which the reflection device is to be attached is arranged below the first section of the cover panel when the lighting device is installed, in particular wherein the section of the vehicle body to which the reflection device is to be attached is arranged at an angle of between 30° and 80° to the first section of the cover panel. In this case, the lighting device consists of two components which are only positioned in relation to each other when the lighting device is mounted on and/or in the motor vehicle in such a way that the part of the light emerging downwards from the housing can be reflected rearward by the reflection device as desired. As a rule, the reflection device is applied to the corresponding section of the vehicle body after painting. However, it is also possible to apply the reflection device to the corresponding section of the vehicle body before painting.

It is possible that the lighting device comprises a reflector arranged in the housing, wherein the lighting device is arranged so that the light generated by the light source is at least partially reflected by the reflector onto the cover panel so that it can at least partially emerge therefrom, in particular wherein the reflector is concavely curved. The inclination and, if necessary, the curvature of the reflector can be used to determine where and how the light strikes the reflection device. For example, the light can have a greater intensity in an upper part of the reflection device than in a lower part of the reflection device.

It may be provided that the reflector has several reflective surfaces, preferably inclined to each other, which are arranged in such a way that at least parts of the light generated by the light source are reflected several times by the reflector before striking the cover panel. This can result in better homogenization of the light emerging through the cover panel. Furthermore, a greater proportion of the light emitted by the light source can be reflected back to the cover panel due to the large number of reflective surfaces. This improves the performance of the lighting device.

It is possible that the light source is arranged in such a way that the light spreads upwards from the light source when the lighting device is installed. This configuration can ensure that the majority of reflective surfaces can be optimally used for reflection onto the cover panel.

It may be provided that the lighting device is arranged so that part of the light emitted by the light source does not exit downwards through the cover panel when the lighting device is installed, but exits directly to the rear of the lighting device. This part of the light emitted directly to the rear can be used in particular to generate a further light function, for example to generate a reversing light or a rear fog light.

It is possible for the lighting device to extend over the entire or almost the entire width of the motor vehicle when installed. This measure also makes it possible to achieve an attractive design for the lighting device.

BRIEF DESCRIPTION OF THE DRAWINGS

The invention is explained in more detail below with reference to the attached drawings. In the figures.

DETAILED DESCRIPTION OF THE CURRENT EMBODIMENT

Figure 1:
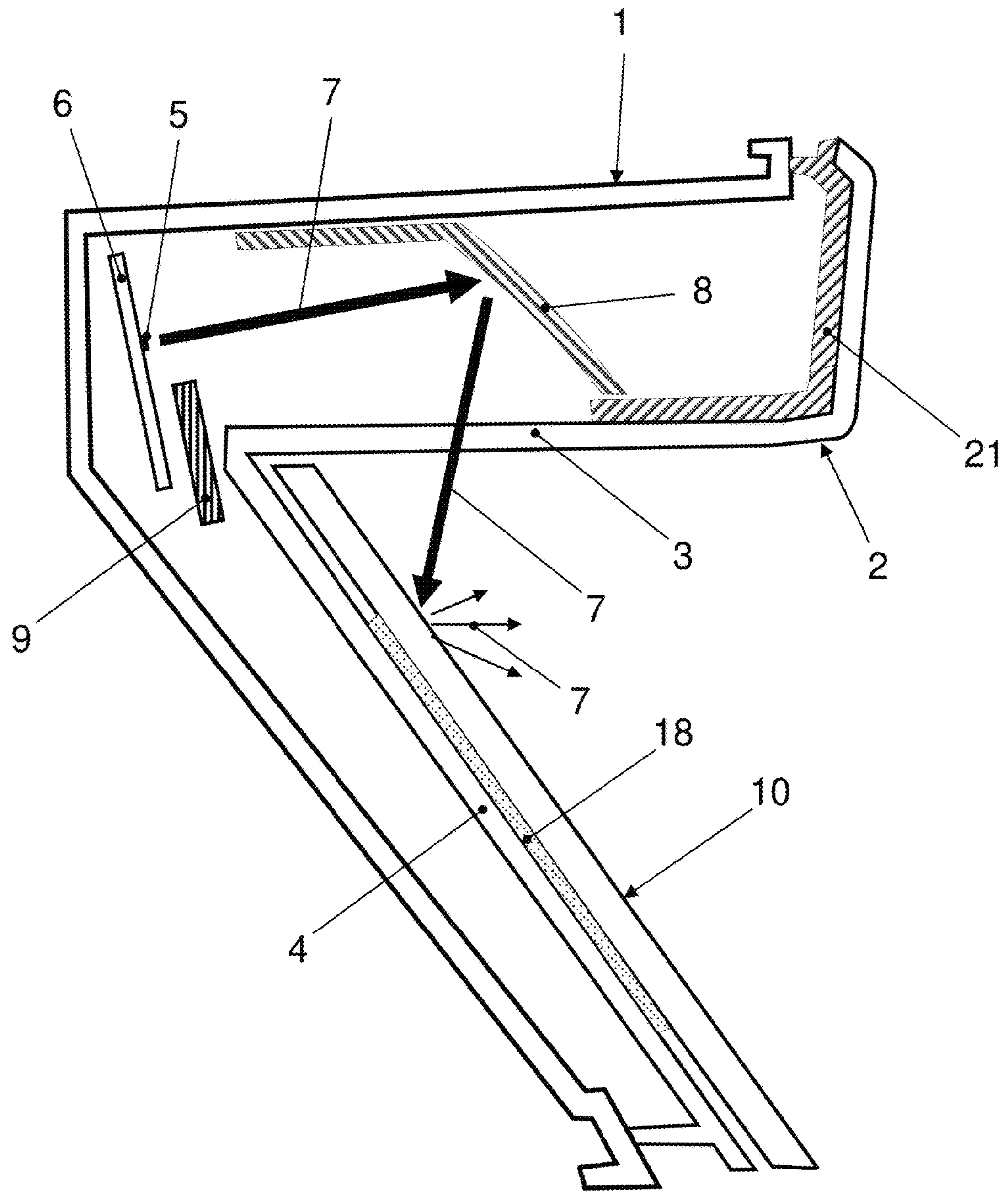
FIG. 1 is a schematic sectional view of a first embodiment of a lighting device according to the invention.

In the figures, identical or functionally identical parts are marked with the same reference symbols.

The lighting device shown in the figures is designed in particular as a combination tail light.

The lighting device comprises a housing 1 and a cover panel 2, which covers the housing 1 at least partially. The cover panel 2 is at least partially transparent. The housing 1 and the cover panel 2 extend into the drawing plane of FIGS. 1 to 6 or in the transverse direction of the motor vehicle when the lighting device is installed. The lighting device can extend over the entire or almost the entire width of the motor vehicle.

In the illustrated embodiments, the cover panel 2 has a first section 3 and a second section 4. The first section 3 extends as in FIGS. 1 to 6 and when the lighting device is installed, essentially horizontally. The second section 4 adjoins the first section 3 at the left-hand end shown in FIGS. 1 to 6, at the end facing the front of the motor vehicle when installed, and extends obliquely downwards and rearward. The angle between the first and second sections 3, 4 can, in particular, be between 30° and 80°, preferably between 40° and 70°, for example around 60°.

The lighting device also comprises at least one light source 1, preferably several light sources 5, which are designed as light-emitting diodes (LEDs) arranged on a printed circuit board 6. In particular, the light sources 5 can be arranged next to each other in the transverse direction of the motor vehicle. The light-emitting diodes 5 can also have different colors in order to implement different functions such as a tail light, a brake light, a position light, a reversing light, a daytime running light or a direction indicator. The light source 5 shown in FIGS. 1 to 6 is used to generate a tail light.

Figure 2:
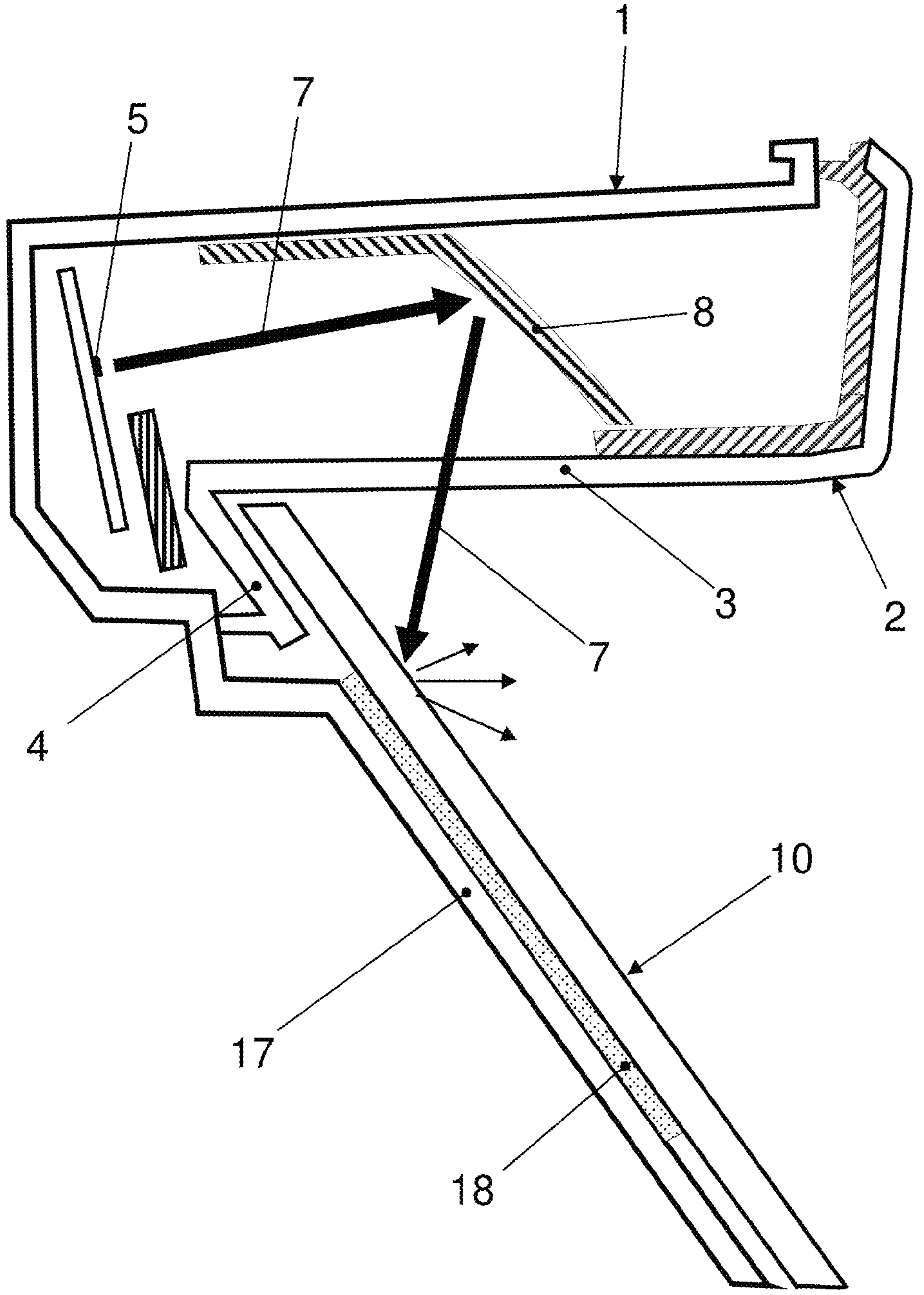
FIG. 2 is a schematic sectional view of a second embodiment of a lighting device according to the invention.
Figure 3:
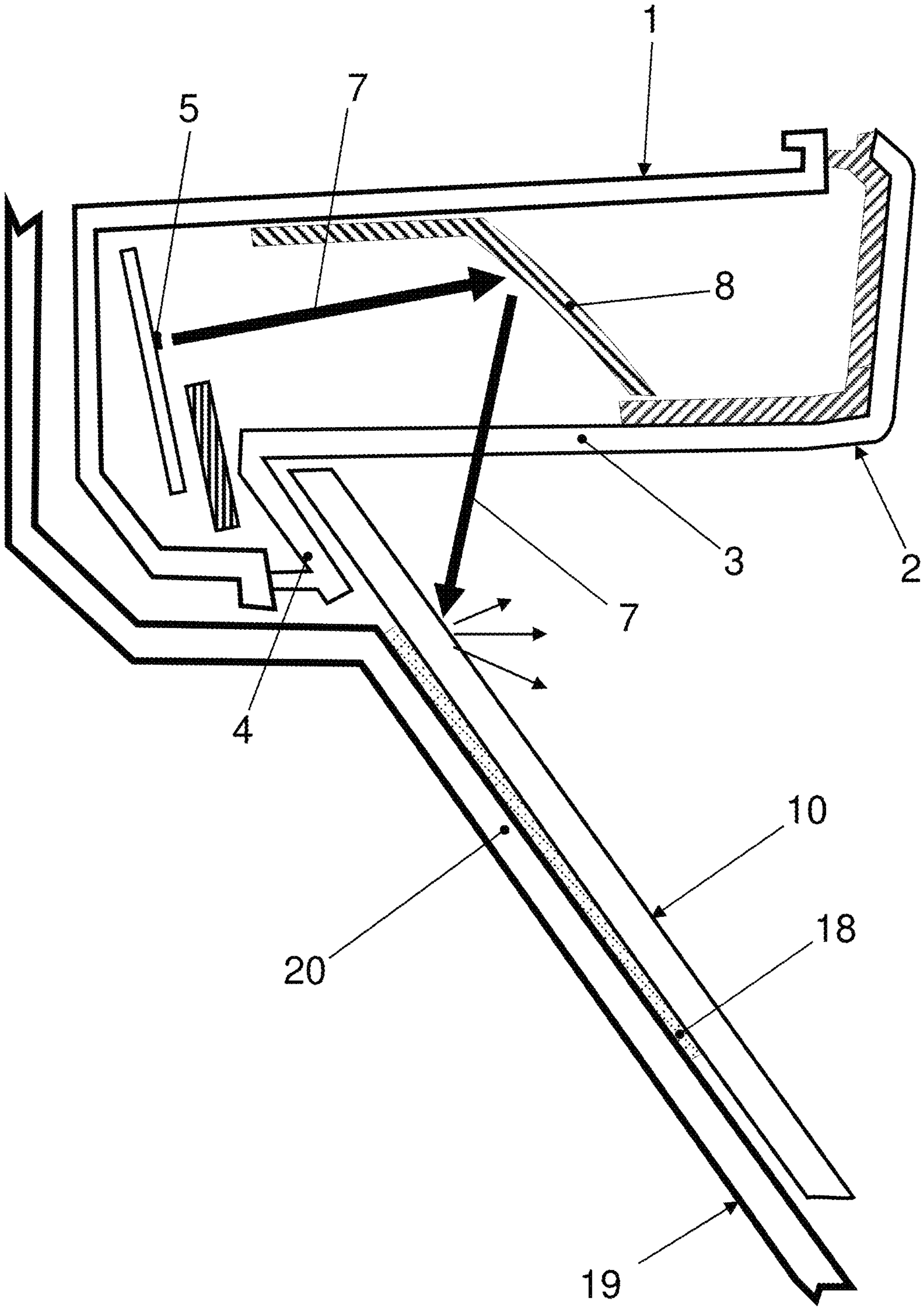
FIG. 3 is a schematic sectional view of a third embodiment of a lighting device according to the invention.

In the embodiments shown in FIGS. 1 to 3, the printed circuit board 6 is arranged approximately vertically in the housing 1 so that the light 7 emitted by the light source 5 moves to the right inside the housing 1 in FIGS. 1 to 3 or rearward in the installed state.

The embodiments of the lighting device illustrated in FIGS. 1 to 6 further comprise a reflector 8, which is arranged in the housing 1 such that the light 7 is at least partially reflected downwards from the reflector 8 towards the first section 3 of the cover panel 2 and emerges at least partially downwards from the housing 1 through this first section 3. In particular, the reflector 8 can be concavely curved.

It is possible that the first section 3 of the cover panel 2, in particular the inside of the first section 3 of the cover panel 2 facing the housing 1, is provided with a structure not shown. This structuring can contribute to the homogenization of the light 7. The structuring can be created, for example, by exposing the first section 3 to laser light.

The lighting device can also comprise a mask 9 arranged in the housing 1 (see FIGS. 1 to 3). The mask 9 is partially arranged in front of the printed circuit board 6 to prevent an observer from looking directly at the light source 1 from below through the transparent first section 3 of the cover panel 2.

The lighting device also comprises a reflection device 10, which in the embodiment example shown in FIG. 1 is applied, preferably glued, to the outside of the second section 4 of the cover panel 2. For this purpose, a connecting means 18 is provided between the reflection device 10 and the second section 4, which is designed as a double-sided adhesive tape, for example. It is certainly possible to attach the reflection device 10 to the cover panel 2 in another way, for example by screwing it on.

The section of the light 7 exiting through the first section 3 of the cover panel strikes the reflection device 10 at least partially and is reflected by it at least partially in such a way that it moves away from the rear end of the motor vehicle rearward. The reflection device 10 is designed in such a way that the light 7 is reflected at least slightly diffusely rearward. For this purpose, the reflection device 10 has a diffusing structure 11.

FIGS. 7 to 10 show different embodiments of the reflection device 10. All of the embodiments have a transparent component 12 into which the light 7 can at least partially penetrate. When installed, the component 12 has a rear entry surface 13 for the light 7.

Figure 7:
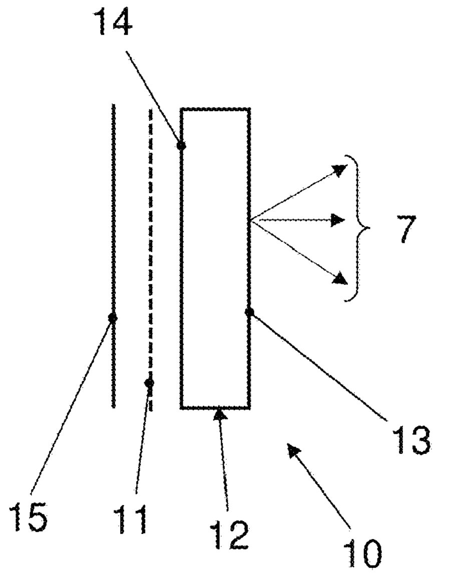
FIG. 7 is a schematic sectional view of a first embodiment of a reflection device of a lighting device according to the invention.

In the first embodiment shown in FIG. 7, the diffusing structure 11 is arranged on an exit surface 14 of the transparent component 12 opposite the entry surface 13. The diffusing structure 11 can be produced in particular by the transparent component 12 being made of plastic and manufactured by injection molding in an injection mold in which the mold surface producing the exit surface 14 is structured. Other methods for creating a structure on the exit surface 14, such as subsequent structuring of a smooth surface after injection molding, are certainly possible.

A reflective layer 15 is applied to the diffusing structure 11 of the exit surface 14. The layer 15 can be a coating in particular. The layer 15 can have a reflectivity that is significantly below 100%, in particular a reflectivity between 20% and 80%, for example around 50%.

Figure 8:
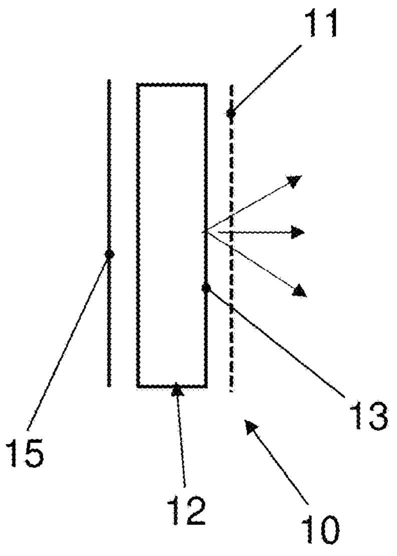
FIG. 8 is a schematic sectional view of a second embodiment of a reflection device of a lighting device according to the invention.

In the second embodiment of the reflection device 10 shown in FIG. 8, the diffusing structure 11 is not arranged on the exit surface 14, but on the entry surface 13. In this embodiment, the diffusing structure 11 can also be produced during injection molding in an injection mold or by subsequent structuring.

Figure 9:
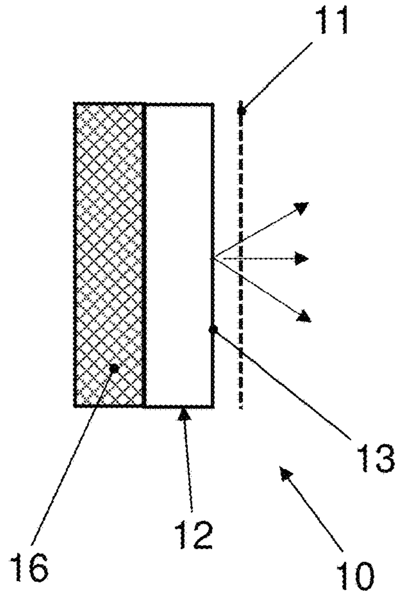
FIG. 9 is a schematic sectional view of a third embodiment of a reflection device of a lighting device according to the invention.

In the third embodiment of the reflection device 10 shown in FIG. 9, the diffusing structure 11 is also arranged on the entry surface 13. In contrast to the second embodiment, no reflective layer is applied to the exit surface 14. Rather, in the third embodiment, an opaque component 16 is in contact with the exit surface 14, from which the light 7 is at least partially reflected back.

Figure 10:
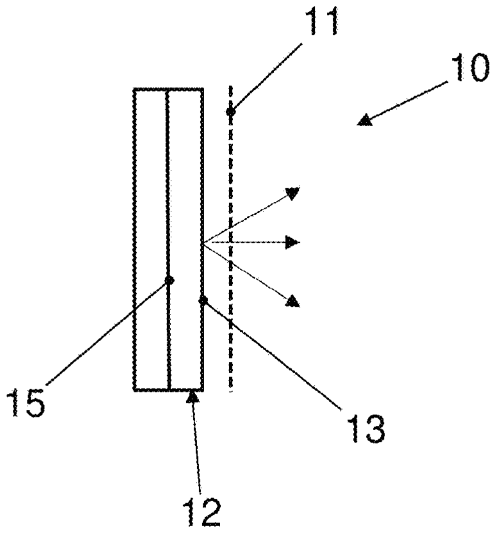
FIG. 10 is a schematic sectional view of a fourth embodiment of a reflection device of a lighting device according to the invention.

In the fourth embodiment of the reflection device 10 shown in FIG. 10, the diffusing structure 11 is also arranged on the entry surface 13. In contrast to the second embodiment, the reflective layer 15 is not applied to the exit surface 14, but is arranged in the transparent component 12, in particular approximately in the center.

The second embodiment of the lighting device shown in FIG. 2 differs from the embodiment shown in FIG. 1 in that the second section 4 of the cover panel 2 ends just below the first section 3. In this embodiment, the reflection device 10 is attached to the outside of the housing 1. A section 17 of the housing 1 extends under the first section 3 of the cover panel 2. In particular, the section 17 of the housing, on which the reflection device is arranged, is arranged at an angle of between 30° and 80° to the first section 3 of the cover panel 2.

The third embodiment of the lighting device shown in FIG. 3 differs from the embodiment shown in FIG. 1 in that both the second section 4 of the cover panel 2 and the housing 1 end just below the first section 3 of the cover panel 2. In this embodiment, the reflection device 10 is attached to the outside of the vehicle body 19 of the motor vehicle, which is indicated in sectional view in FIG. 3. A section 20 of the vehicle body 19 extends under the first section 3 of the cover panel 2. In particular, the section 20 of the vehicle body 19, on which the reflection device is arranged, is arranged at an angle of between 30° and 80° to the first section 3 of the cover panel 2.

In FIGS. 1 to 3, a cover 21 is provided in the right-hand part or, when installed, the rear part of the housing 1, which prevents light from escaping through the cover panel 2 to the right or rear of the housing 1. It is quite possible that the cover 21 is not provided in one or more areas of the lighting device extending in the transverse direction over the vehicle body 19, so that light can emerge directly from the housing 1 to the right or rear in this at least one section. In this at least one section, the reflector can be at least partially non-permeable or partially permeable.

This light emitted directly rearward can be used to generate a reversing light or rear fog light, for example.

Figure 4:
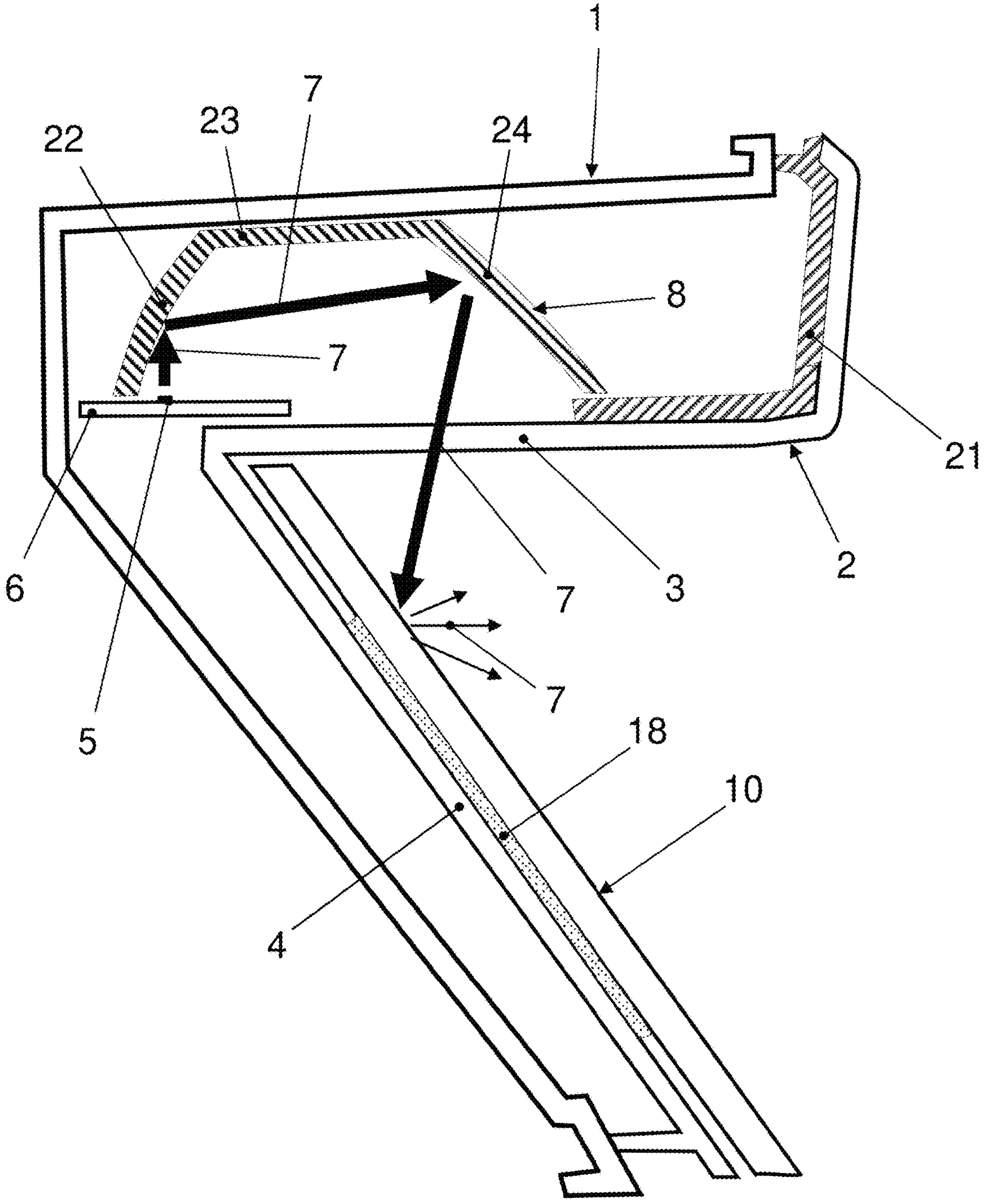
FIG. 4 is a schematic sectional view of a fourth embodiment of a lighting device according to the invention.
Figure 5:
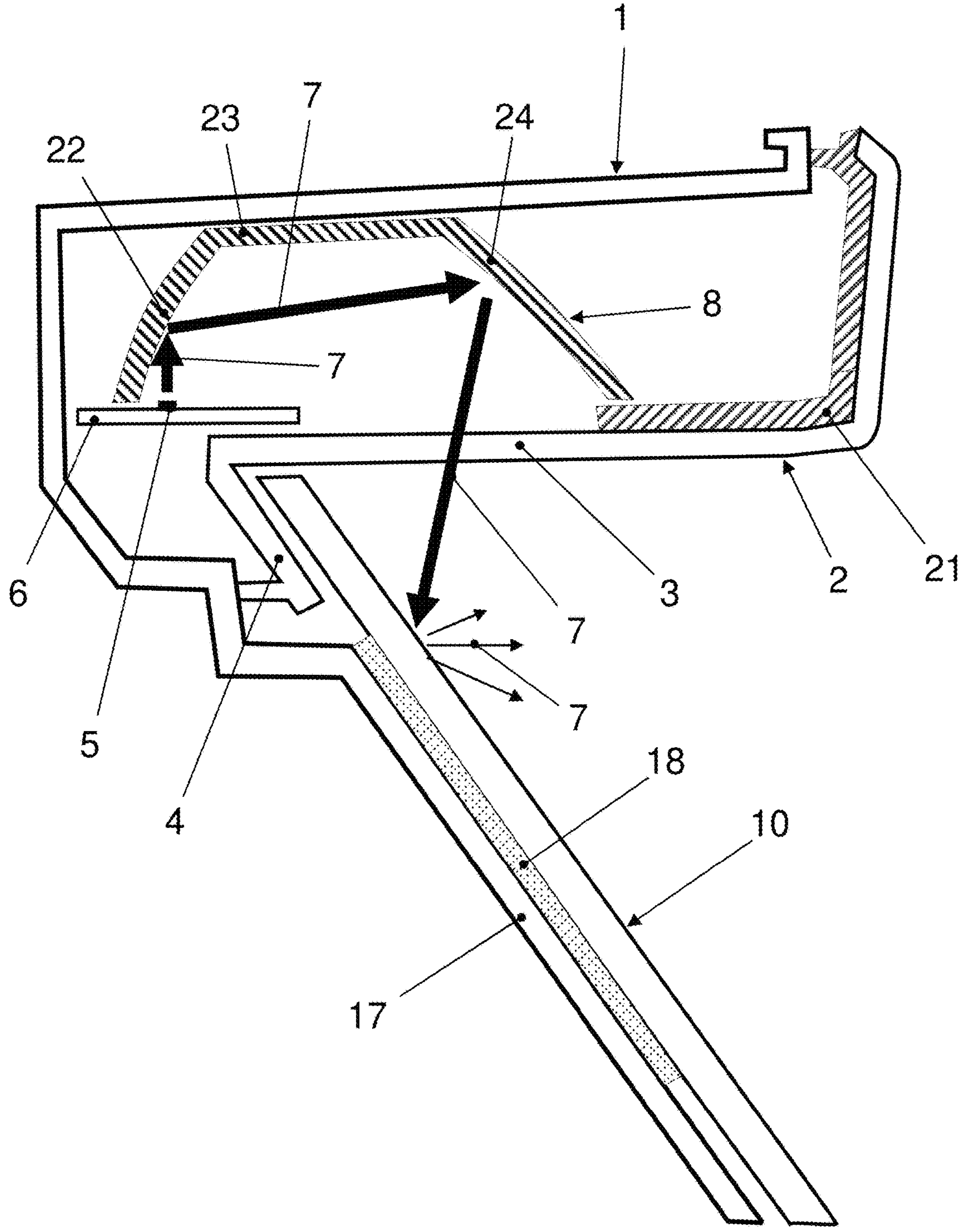
FIG. 5 is a schematic sectional view of a fifth embodiment of a lighting device according to the invention.
Figure 6:
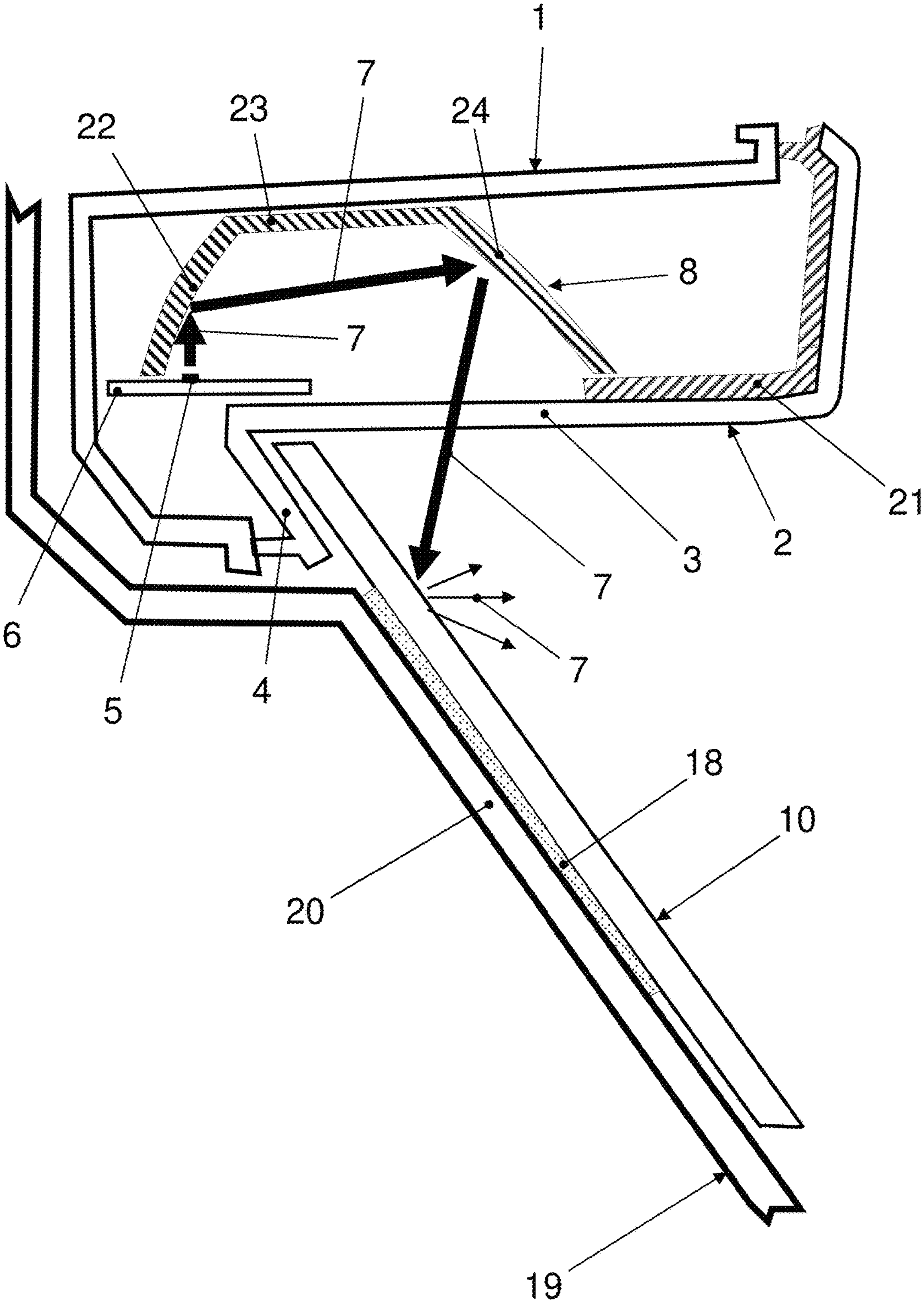
FIG. 6 is a schematic sectional view of a sixth embodiment of a lighting device according to the invention.

The embodiments illustrated in FIGS. 4 to 6 differ from the embodiments illustrated in FIGS. 3 to 6 in that the printed circuit board 6 is not arranged vertically but horizontally in the housing 1. As a result, the light 7 emitted by the light source 5 moves upwards inside the housing 1 in FIGS. 4 to 6 or, when installed, from the light source 5. Furthermore, the embodiments of the lighting device shown in FIGS. 4 to 6 have a reflector 8 which is more extensive than the reflector 8 in the embodiments shown in FIGS. 1 to 3.

In particular, the reflector 8 of the fourth to sixth embodiments has three reflective surfaces 22, 23, 24 that are inclined relative to one another. The first reflective surface 22 extends upwards from the printed circuit board 6, the second reflective surface 23 adjoins the first surface 22 and extends horizontally to the right in FIGS. 4 to 6. The third reflective surface 24 adjoins the second surface 23 and extends up to the cover 21 of the housing.

In this way, essentially all of the light 7 emitted by the light source 5 can be reflected to the cover panel 3 by reflection on the reflector 8, in particular by multiple reflections on different reflective surfaces 21, 22, 23 of the reflector 8. In the embodiments shown in FIGS. 4 to 6, the mask 9 can be dispensed with. Furthermore, in the embodiments shown in FIGS. 4 to 6, a corresponding design of the reflector 8 and the cover 21 can ensure that no part of the light escapes directly rearward from the housing 1.

The fourth embodiment of the lighting device shown in FIG. 4 corresponds to the first embodiment shown in FIG. 1, apart from the differences explained with regard to the orientation of the printed circuit board 6 and the design of the reflector 8. In the fourth embodiment, the reflection device 10 is therefore applied to the outside of the second section 4 of the cover panel 2, as in the first embodiment.

Similarly, the fifth embodiment of the lighting device shown in FIG. 5 corresponds to the second embodiment shown in FIG. 2, apart from the differences explained with regard to the orientation of the printed circuit board 6 and the design of the reflector 8. In the fifth embodiment, the reflection device 10 is therefore attached to the outside of the housing 1, as in the second embodiment.

Similarly, the sixth embodiment of the lighting device shown in FIG. 6 corresponds to the third embodiment shown in FIG. 3, apart from the differences explained with regard to the orientation of the printed circuit board 6 and the design of the reflector 8. In the sixth embodiment, as in the third embodiment, the reflection device 10 is therefore attached to the outside of the vehicle body 19 of the motor vehicle, which is indicated in sectional drawings in FIG. 6.

LIST OF REFERENCE SIGNS

1 housing
2 cover panel
3 first section of the cover panel
4 second section of the cover panel
5 light source
6 printed circuit board

7 light
8 reflector
9 mask
10 reflection device
11 diffusing structure of the reflection device
12 transparent component of the reflection device
13 entry surface of the transparent component
14 exit surface of the transparent component
15 reflective layer of the reflection device
16 opaque component of the reflection device
17 section of the housing
18 connecting means
19 vehicle body
20 section of the vehicle body
21 cover in the housing
22 first reflective surface of the reflector
23 second reflective surface of the reflector
24 third reflective surface of the reflector The above description is that of a current embodiment of the invention. Various alterations and changes can be made without departing from the spirit and broader aspects of the invention. This disclosure is presented for illustrative purposes and should not be interpreted as an exhaustive description of all embodiments of the invention or to limit the scope of the claims to the specific elements illustrated or described in connection with these embodiments. Any reference to elements in the singular, for example, using the articles "a," "an," "the," or "said," is not to be construed as limiting the element to the singular.

The invention claimed is:

1. A lighting device for the rear end of a motor vehicle, comprising:

a light source;

a housing on or in which the light source is arranged;

a cover panel covering the housing at least partially to enclose the light source therein, the cover panel being transparent and including a horizontal section and an angled section, the angled section extending downward and rearward relative to the horizontal section; and a reflection device disposed outside of the housing, the reflection device being supported at least partially by a rearward-facing surface of the angled section of the cover panel;

wherein light generated by the light source is emitted at least partially from the housing through the horizontal section of the cover panel when the lighting device is in an installed state in the motor vehicle, such that the light generated by the light source is at least partially incident on the reflection device and is at least partially reflected by the reflection device and propagates rearwardly away from the rear end of the motor vehicle as a tail light, a brake light, a position light, a reversing light, or a daytime running light.

2. The lighting device of claim 1, wherein the reflection device has a diffusing structure.

3. The lighting device of claim 1, wherein the reflection device has a transparent component which has an entry surface for the light emitted at least partially through the cover panel.

4. The lighting device of claim 3, wherein the reflection device has a reflective layer which at least partially reflects the light incident on the reflection device.

5. The lighting device of claim 1, wherein the reflection device has a transparent component overlying an opaque component, wherein the opaque component at least partially reflects the light incident on the reflection device.

6. The lighting device of claim 3, further including a diffusing structure arranged on the entry surface of the transparent component or on an exit surface of the transparent component.

7. The lighting device of claim 5, wherein the opaque component is arranged on the exit surface of the transparent component of the reflection device.

8. The lighting device of claim 3, wherein a diffusing structure is arranged on an exit surface of the transparent component opposite of the entry surface, and wherein an opaque component is arranged on a side of the diffusing structure facing away from the exit surface.

9. The lighting device of claim 4, wherein the reflective layer is arranged on the transparent component.

10. The lighting device of claim 1, wherein the angled section is arranged below the first horizontal section and forms an angle of between 30° and 80° with the horizontal section.

11. The lighting device of claim 1, further comprising a reflector within the housing, wherein the reflector is concavely curved, such that the reflector reflects light onto the cover panel so that the light can emerge therefrom.

12. The lighting device of claim 11, wherein the reflector has a plurality of reflective sections that are inclined with respect to each other, such that light generated by the light source is reflected several times by the reflector before impinging the cover panel.

13. The lighting device of claim 12, wherein the light generated by the light source is emitted at least partially upward when the lighting device is in the installed state.

14. The lighting device of claim 1, wherein the reflection device comprises an opaque layer underlying a transparent layer.

* * * * *